(12) United States Patent
McGray (10) Patent No.: US 12,031,463 B1
(45) Date of Patent: Jul. 9, 2024

(54) SEPARATOR FOR LIQUID AND GAS

(71) Applicant: DeltaHawk Engines, Inc., Racine, WI (US)

(72) Inventor: Christopher McGray, Racine, WI (US)

(73) Assignee: DeltaHawk Engines, Inc., Racine, WI (US)

( * ) Notice: Subject to any disclaimer, the term of this patent is extended or adjusted under 35 U.S.C. 154(b) by 0 days.

(21) Appl. No.: 18/326,462

(22) Filed: May 31, 2023

(51) Int. Cl.
  *F01M 11/03* (2006.01)
  *F16N 39/00* (2006.01)

(52) U.S. Cl.
  CPC ........... *F01M 11/03* (2013.01); *F16N 39/002* (2013.01); *F01M 2011/038* (2013.01)

(58) Field of Classification Search
  CPC .............. B01D 45/08; F01M 13/04; F01M 2013/0422; F01M 2013/0433; F01M 13/0405; F01M 2011/038; F01M 11/03; F16N 39/002
  USPC ............................................. 184/6.11, 6.23
  See application file for complete search history.

(56) References Cited

U.S. PATENT DOCUMENTS

| | | | | |
|---|---|---|---|---|
| 2,286,005 A | * | 6/1942 | Otto ....................... | B01D 45/08 55/420 |
| 2,575,315 A | * | 11/1951 | Lowell .................... | F02B 75/22 494/900 |
| 2,610,788 A | * | 9/1952 | Lowell ................... | F16N 39/002 184/6.24 |
| 2,811,218 A | * | 10/1957 | Winslow ............... | B01D 35/147 210/172.6 |
| 2,811,220 A | * | 10/1957 | Winslow ............... | B01D 36/001 210/120 |
| 3,377,779 A | * | 4/1968 | Kronk .................... | F16N 39/002 96/212 |
| 3,378,104 A | * | 4/1968 | Venable ............... | F16H 57/0458 184/6.12 |
| 3,771,287 A | * | 11/1973 | Sunderland ........... | F16N 39/002 96/219 |
| 3,888,227 A | * | 6/1975 | Green .................... | F01M 11/10 123/196 R |
| 3,888,228 A | * | 6/1975 | Koivunen ................ | F01M 1/10 123/196 R |
| 5,085,677 A | * | 2/1992 | Ville ................... | B01D 19/0057 96/210 |
| 5,429,101 A | * | 7/1995 | Uebelhoer ........... | F01M 13/021 123/573 |
| 5,507,268 A | * | 4/1996 | Schlattl ................. | B01D 45/14 55/DIG. 19 |
| 5,587,068 A | * | 12/1996 | Aho, Jr. ............. | B01D 19/0057 210/512.1 |

(Continued)

*Primary Examiner* — Henry Y Liu
(74) *Attorney, Agent, or Firm* — Reinhart Boerner Van Deuren s.c.

(57) ABSTRACT

An oil tank for an engine is provided with a separator that reduces the amount of entrained air in the oil tank. The separator includes a body with an outer wall, a divider wall, and an outlet. The divider wall is located between the outer wall and at least a first portion of the outlet. The divider wall is offset from a curved portion of the outer wall, which defines a flow channel through which the oil flows towards the outlet. The oil increases speed as travels around the divider wall. This movement keeps the oil with some and/or more entrained air closer to the outer wall. In contrast, the oil with less or no entrained air moves closer to the divider wall and may travel more directly to the outlet.

20 Claims, 12 Drawing Sheets

(56) References Cited

U.S. PATENT DOCUMENTS

| | | | | |
|---|---|---|---|---|
| 5,617,834 A * | 4/1997 | Lohr | F02B 75/22 | 123/572 |
| 5,618,335 A * | 4/1997 | Pink | B04B 5/12 | 96/216 |
| 5,947,711 A * | 9/1999 | Myers | F01C 21/007 | 418/101 |
| 6,113,676 A * | 9/2000 | Kumpulainen | B01D 19/0036 | 95/147 |
| 6,659,290 B1 * | 12/2003 | Lawson | B01D 17/0211 | 210/522 |
| 7,017,546 B1 * | 3/2006 | Patel | F01M 13/04 | 123/198 C |
| 7,059,311 B2 * | 6/2006 | Prasad | F02M 25/06 | 123/573 |
| 7,857,883 B2 * | 12/2010 | Scheckel | B01D 46/10 | 55/DIG. 19 |
| 2002/0170524 A1 * | 11/2002 | Lawrence | F01M 11/03 | 123/196 R |
| 2003/0036320 A1 * | 2/2003 | Matsuda | F01M 13/04 | 440/88 L |
| 2003/0110743 A1 * | 6/2003 | Stegmaier | F01M 13/0416 | 55/337 |
| 2003/0172632 A1 * | 9/2003 | Matsubara | F01M 13/04 | 55/459.1 |
| 2004/0098956 A1 * | 5/2004 | Care | B01D 46/003 | 55/400 |
| 2005/0022756 A1 * | 2/2005 | Novlan | F01M 11/061 | 123/196 R |
| 2005/0103571 A1 * | 5/2005 | Beier | F01M 13/04 | 184/6.23 |
| 2005/0120685 A1 * | 6/2005 | Fischer | B01D 45/14 | 55/406 |
| 2005/0188848 A1 * | 9/2005 | Salzman | B01D 53/0415 | 96/134 |
| 2005/0217272 A1 * | 10/2005 | Sheridan | F04D 29/063 | 60/39.08 |
| 2005/0284299 A1 * | 12/2005 | Lane | F01D 25/18 | 96/209 |
| 2006/0032486 A1 * | 2/2006 | Prasad | F01M 13/04 | 55/DIG. 19 |
| 2006/0102159 A1 * | 5/2006 | Hommes | F01M 13/0416 | 55/DIG. 19 |
| 2007/0084157 A1 * | 4/2007 | Heikamp | B01D 46/0004 | 55/320 |
| 2007/0107396 A1 * | 5/2007 | Zuberi | B01D 39/2086 | 422/177 |
| 2007/0272176 A1 * | 11/2007 | Wagner | B01D 45/16 | 123/90.38 |
| 2008/0072755 A1 * | 3/2008 | Dooley | B03C 9/00 | 96/15 |
| 2008/0078291 A1 * | 4/2008 | Daukant | B03C 9/00 | 96/57 |
| 2009/0120854 A1 * | 5/2009 | Parikh | F01M 13/022 | 210/141 |
| 2009/0133581 A1 * | 5/2009 | Fang | F16C 33/6685 | 96/216 |
| 2009/0133961 A1 * | 5/2009 | Corattiyil | B01D 45/14 | 55/452 |
| 2009/0134243 A1 * | 5/2009 | Mount | F01D 25/18 | 55/409 |
| 2009/0193770 A1 * | 8/2009 | Holzmann | F01M 13/04 | 55/318 |
| 2010/0187180 A1 * | 7/2010 | Baten | B01D 45/08 | 60/39.08 |
| 2010/0242931 A1 * | 9/2010 | Huff | F02M 25/06 | 123/574 |
| 2010/0258008 A1 * | 10/2010 | Cheng | B01D 45/16 | 96/190 |
| 2011/0048391 A1 * | 3/2011 | Palumbo | F02M 25/06 | 123/573 |
| 2011/0232785 A1 * | 9/2011 | Takahashi | F01M 11/03 | 137/561 R |
| 2011/0271837 A1 * | 11/2011 | Angst | B01D 45/14 | 96/61 |
| 2011/0314830 A1 * | 12/2011 | Legare | F01D 25/20 | 60/39.08 |
| 2012/0144841 A1 * | 6/2012 | Short | F01M 13/04 | 60/751 |
| 2012/0204723 A1 * | 8/2012 | Angst | B01D 45/14 | 96/61 |
| 2012/0305114 A1 * | 12/2012 | Uenishi | F15B 21/047 | 137/563 |
| 2013/0193048 A1 * | 8/2013 | Theegala | B01D 17/0208 | 210/170.05 |
| 2014/0208702 A1 * | 7/2014 | Lundgren | B01D 46/4227 | 55/357 |
| 2014/0245977 A1 * | 9/2014 | Krystufek | F01M 13/0416 | 55/482 |
| 2015/0176492 A1 * | 6/2015 | Cutrara | F01M 1/00 | 184/106 |
| 2015/0343365 A1 * | 12/2015 | Borkowski | B01D 46/44 | 55/424 |
| 2016/0017812 A1 * | 1/2016 | Sheridan | F02C 3/04 | 415/1 |
| 2016/0030870 A1 * | 2/2016 | Schmelzle | B01D 46/0031 | 285/119 |
| 2016/0032798 A1 * | 2/2016 | Herman | B01D 45/12 | 96/372 |
| 2016/0096183 A1 * | 4/2016 | Guerry | B03C 3/08 | 96/62 |
| 2016/0208650 A1 * | 7/2016 | Craig | B01D 46/62 | |
| 2017/0115068 A1 * | 4/2017 | Gilbert | F28F 13/12 | |
| 2018/0010497 A1 * | 1/2018 | Dwivedi | F01M 13/023 | |
| 2018/0021701 A1 * | 1/2018 | Kulkarni | B01D 19/0057 | 210/167.02 |
| 2018/0334960 A1 * | 11/2018 | Harral | F16N 39/002 | |
| 2019/0093527 A1 * | 3/2019 | Sheridan | F01D 25/18 | |
| 2019/0232190 A1 * | 8/2019 | Rivas | A61K 36/185 | |
| 2020/0071215 A1 * | 3/2020 | Gaspard | B01D 1/0058 | |
| 2020/0271014 A1 * | 8/2020 | Gebhard | F01M 11/0004 | |
| 2020/0284163 A1 * | 9/2020 | Gebhard | B01D 45/14 | |
| 2021/0016217 A1 * | 1/2021 | Khan | F04C 19/004 | |
| 2021/0156515 A1 * | 5/2021 | Schetzel | F02C 7/06 | |
| 2021/0197980 A1 * | 7/2021 | Blewett | F16N 39/002 | |
| 2021/0254506 A1 * | 8/2021 | Legare | F16N 7/38 | |
| 2021/0293164 A1 * | 9/2021 | Arora | F01M 11/0408 | |
| 2022/0088505 A1 * | 3/2022 | Cronin | B01D 19/0042 | |
| 2022/0249981 A1 * | 8/2022 | Amtmann | B01D 17/10 | |
| 2022/0307397 A1 * | 9/2022 | Wall | F01M 11/0004 | |
| 2022/0307488 A1 * | 9/2022 | Cai | F02M 37/20 | |
| 2022/0364563 A1 * | 11/2022 | Griggs | F04C 29/0092 | |
| 2023/0073387 A1 * | 3/2023 | Donahue | F01M 3/00 | |
| 2023/0160322 A1 * | 5/2023 | Raimarckers | F01D 25/18 | 184/6.11 |
| 2023/0366397 A1 * | 11/2023 | Bishop | F04C 14/06 | |
| 2023/0398488 A1 * | 12/2023 | Kouzel | B01D 17/0214 | |

* cited by examiner

SEPARATOR FOR LIQUID AND GAS

BACKGROUND OF THE INVENTION

The present invention relates generally to the field of engines. The present invention relates specifically to a separator for liquid and gas, such as for use to separate entrained air from oil in an oil tank.

SUMMARY OF THE INVENTION

One embodiment of the invention relates to an oil tank including a tank body which defines a storage compartment. The storage compartment has an upper portion and a lower portion. A separator is located in the upper portion of the tank body. The separator includes a separator body with a top surface, a bottom surface opposite the top surface, an outer wall located between the top surface and bottom surface, and an internal chamber defined by the top surface, the bottom surface, and the outer wall. Additionally, the separator includes an inlet, an air vent, and an outlet. The inlet provides fluid communication for the oil between an exterior of the separator body and the internal chamber. The air vent provides fluid communication for the air between the internal chamber and the exterior of the body. The outlet provides fluid communication for the oil between the internal chamber and the lower portion of the tank body. Further, the separator includes a divider wall within the internal chamber. The divider wall is spaced by a distance from a curved portion of the outer wall and is convex with respect to the curved portion. The divider wall is positioned between the curved portion of the outer wall and at least a first portion of the outlet. Together, the divider wall and the curved portion of the outer wall define a flow channel through which the oil may flow, and the flow channel directs the oil towards the outlet and out of the internal chamber.

Another embodiment of the invention relates to an air and oil separator. The air and oil separator includes a body with a top surface, a bottom surface opposite the top surface, and an outer wall located between the top surface and the bottom surface. The top surface, bottom surface, and outer wall define an internal chamber. Additionally, the separator includes an inlet for providing fluid communication for the oil between an exterior of the body and the internal chamber, and the separator includes a plurality of apertures for providing fluid communication for the oil between the internal chamber and the exterior of the body. The plurality of apertures is spaced at least 0.75 inches from the outer wall. Further, the separator includes a divider wall located between the outer wall and at least a first portion of the plurality of apertures.

Another embodiment of the invention relates to an air and oil separator with a body and an entrance compartment. The body includes a top surface, a bottom surface opposite the top surface, a first side wall located between the top surface and the bottom surface, a second side wall opposite the first side wall, and an internal chamber defined by the top surface, the bottom surface, the first side wall, and the second side wall. The entrance compartment is located in the internal chamber and has an outer wall and an opening in the outer wall. An air vent is located in the entrance compartment for providing fluid communication for the air between the entrance compartment and the exterior of the body. The separator also includes an inlet for providing fluid communication for the oil between an exterior of the body and the entrance compartment and an outlet for providing fluid communication for oil between the internal chamber and the exterior of the body. Further, the separator includes a divider wall located in the internal chamber. The divider wall includes a first end and a second end. The first end is attached to the outer wall of the entrance compartment adjacent to the opening. The second end is located between the second side wall and at least a first portion of the outlet. As such, the divider wall defines a flow channel through which oil may flow from the opening to the outlet.

Additional features and advantages will be set forth in the detailed description which follows and will be readily apparent to those skilled in the art from the description or recognized by practicing the embodiments as described in the written description and/or shown in the accompanying drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a separator for separating entrained air from oil in an oil tank of an engine are shown. Engines can receive oil from an oil tank to lubricate various parts of the engine. However, as oil is pumped through the engine, air can become entrained in the oil. Entrained air reduces the lubricating effectiveness of the oil. This can lead to a reduction of engine performance, efficiency, and life.

Applicant has developed various separators for oil tanks that are believed to provide for various advantages over typical oil tanks, including reducing the amount of entrained air in the oil before the oil is pumped from the oil tank into the engine. Specifically, the separators discussed herein provide three stages of separation, while also providing a steady supply of oil to the engine.

Referring generally to the figures, first, the oil enters the separator 140 through the inlet 158. The inlet 158 directs the oil into an entrance compartment 160. The entrance compartment 160 is cylinder shaped and the inlet 158 sprays the oil tangentially against a curved outer wall 174 of the entrance compartment 160. As such, the oil travels along the inside surface 182 of the outer wall 174 and creates a swirling effect. This swirling effect is the first stage of separation. In this stage, some entrained air is separated from the oil due to the centrifugal force caused by the swirling movement of the oil. The air that has separated from the oil travels up towards the top of the entrance compartment 160 and out of the separator 140. Meanwhile, the force of gravity pulls the oil down towards the bottom of the entrance compartment 160 and through an opening 180 in the outer wall 174 of the entrance compartment 160.

Second, as the oil flows out of the entrance compartment 160 and through the opening 180, a divider wall 162 intercepts the oil directing the oil towards an outlet 164. The divider wall 162 is spaced from the outer walls 148, 150, 152, 154 of the separator 140. The divider wall 162 and the outer walls 148, 150, 152, 154 define a flow channel through which the oil may flow from the opening 180 to the outlet 164. The oil flows at a relatively slower rate around the divider wall 162 in comparison to the flow rate within the entrance compartment 160. The movement around the divider wall 162 allows for additional entrained air to separate from the oil. As the oil travels around the curved portion of the flow channel, the oil containing more entrained air moves closer to the outer walls 152, 154 and defines an outer portion 212 of the flow channel. In contrast, oil with less or no entrained air moves closer to divider wall 162, which defines an inner portion 210 of the flow channel.

As oil exits the flow channel, the second stage of separation occurs. The flow channel extends a distance past the end of the divider wall 162; so, the oil continues to flow without interfacing the divider wall 162. The outer portion 212 of the flow channel carrying the oil mixed with more entrained air continues to travel along the outer walls 148, 150, 152, 154 in a substantially straight direction. This gives the entrained air more time in the separator, which allows for more entrained air to separate from the oil. On the other hand, the inner portion 210 of the flow channel continues to curve and intersects at least an outer portion of the outlet 164. As such, the oil in the inner portion 210 of the flow channel can flow more directly towards the outlet 164.

Third, the oil travels through the outlet 164. The outlet 164 provides fluid communication for oil between the internal chamber 156 and the lower portion of storage compartment 116 of oil tank 100. The outlet 164 is defined by a plurality of apertures 204, which in various embodiments are arranged in a circular array. The oil traveling through the outlet 164 experiences the third stage of separation. As the oil travels to the outlet 164, the oil may still contain some air bubbles. These air bubbles may catch on the edges of the plurality of apertures 204. As more air bubbles are caught on the apertures 204 (e.g., the periphery of apertures 204, the bubbles may connect with each other and rise out of the oil. This provides a tertiary level of air separation for the oil as it leaves the separator.

Generally, as the oil travels through the separator 140, it maintains a rapid flow rate. Applicant has found that the oil flows from the inlet to the outlet in a few seconds. Specifically, in various embodiments, the oil can flow through separator at a flow rate of 8 to 12 gallons per minute. As such, Applicant has found that the separator effectively reduces entrained air in the oil, while also allowing for a steady supply of oil to the engine.

Figure 1:
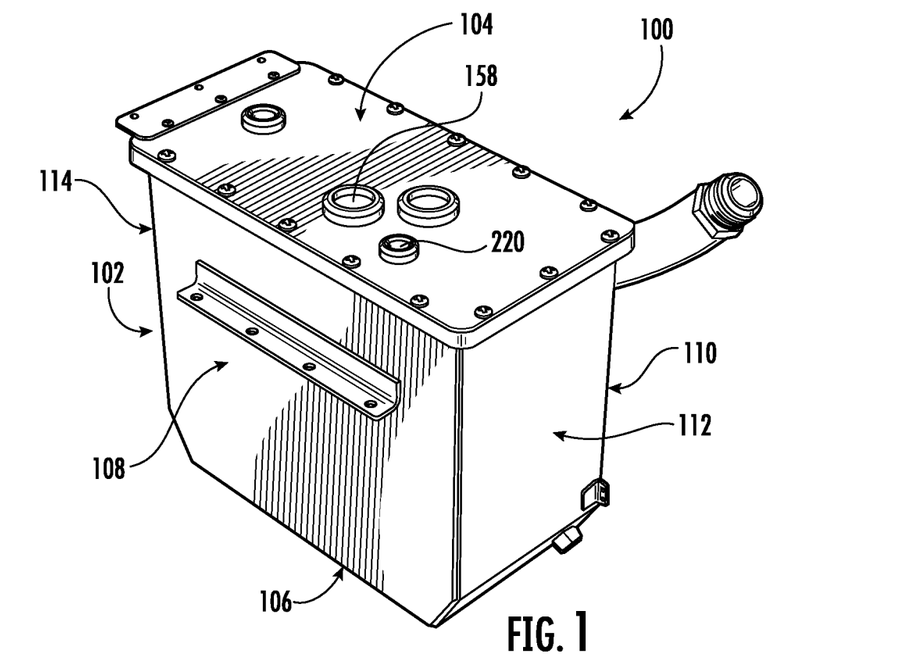
FIG. 1 is a front perspective view of an oil tank with a separator mounted inside the oil tank, according to an exemplary embodiment.
Figure 2:
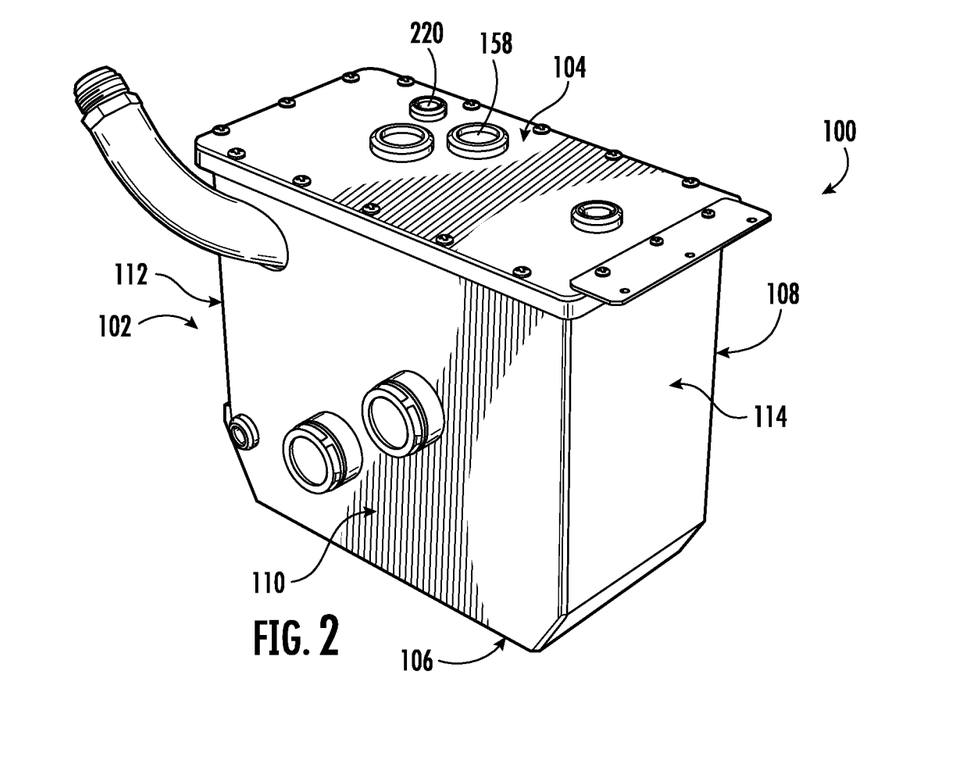
FIG. 2 is a rear perspective view of the oil tank of FIG. 1, according to an exemplary embodiment.

Referring now more specifically to FIGS. 1 and 2, an oil tank 100 for an engine is shown according to an exemplary embodiment. Oil tank 100 has a tank body 102. Body 102 has a top surface 104 and a bottom surface 106 opposite the top surface. Body 102 also includes a first side wall 108, a second side wall 110, a third side wall 112, and a fourth side wall 114. Each side wall 108, 110, 112, and 114 is located between and extends between top surface 104 and bottom surface 106. Together, top surface 104, bottom surface 106, first side wall 108, second side wall 110, third side wall 112, and fourth side wall 114 define a storage compartment 116.

Figure 3:
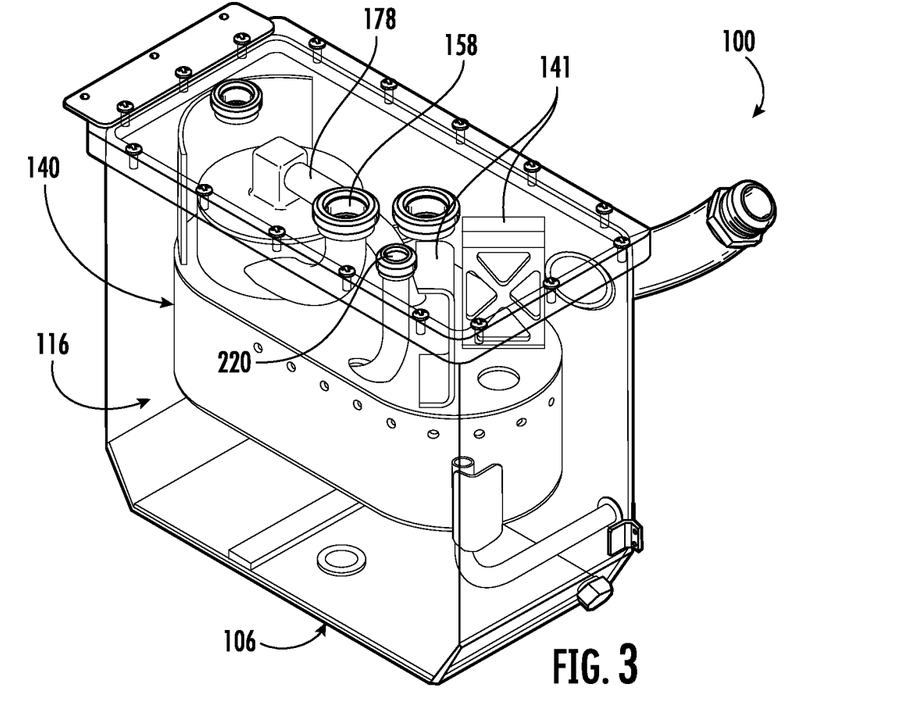
FIG. 3 is a front perspective view of the oil tank of FIG. 1, with a transparent top surface and transparent side walls, according to an exemplary embodiment.
Figure 4:
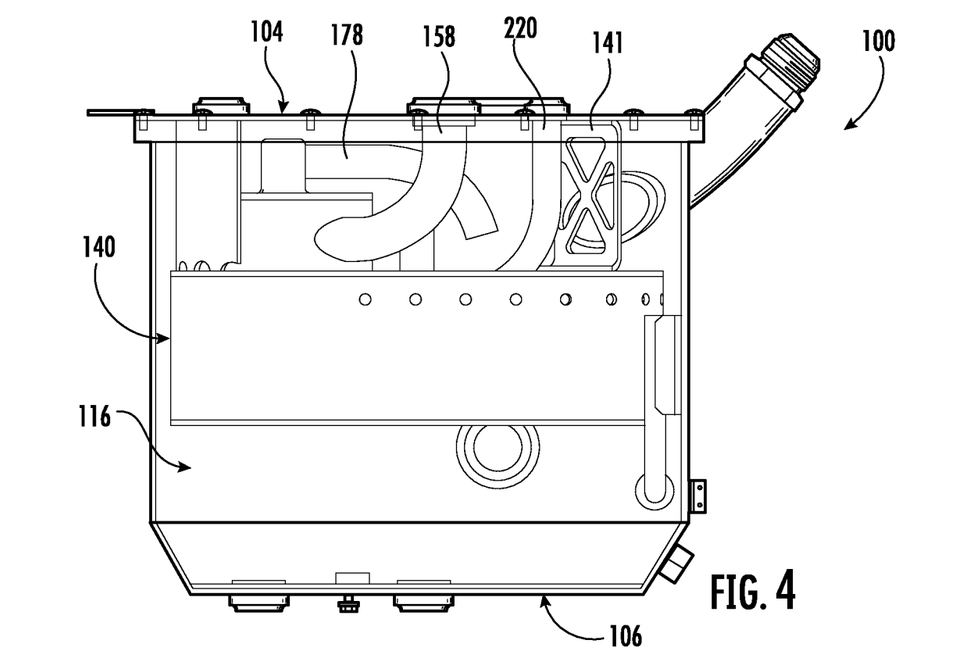
FIG. 4 is a side plan view of the oil tank of FIG. 1, with transparent top surface and transparent side walls, according to an exemplary embodiment.
Figure 5:
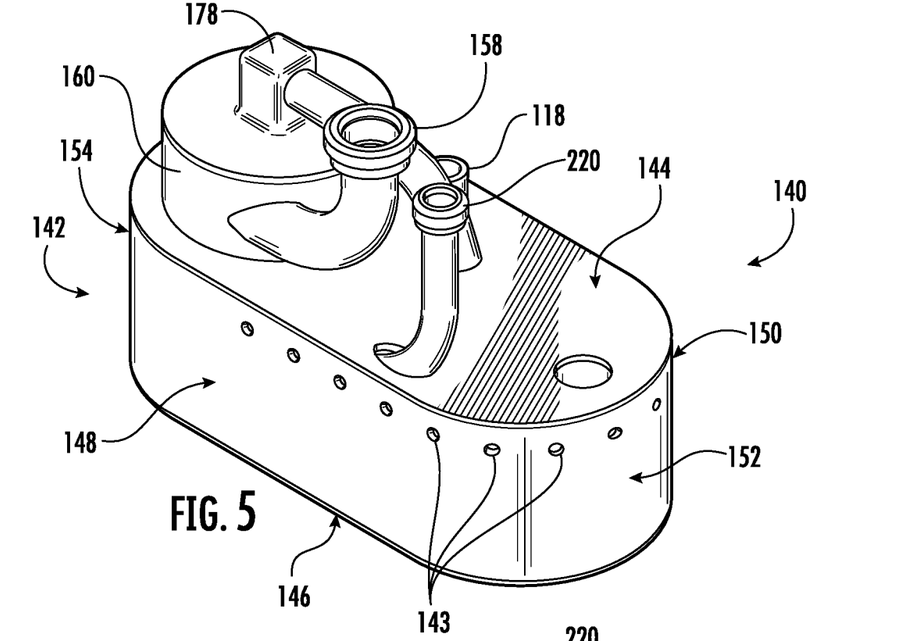
FIG. 5 is a front perspective view of the separator of FIG. 1, according to an exemplary embodiment.
Figure 6:
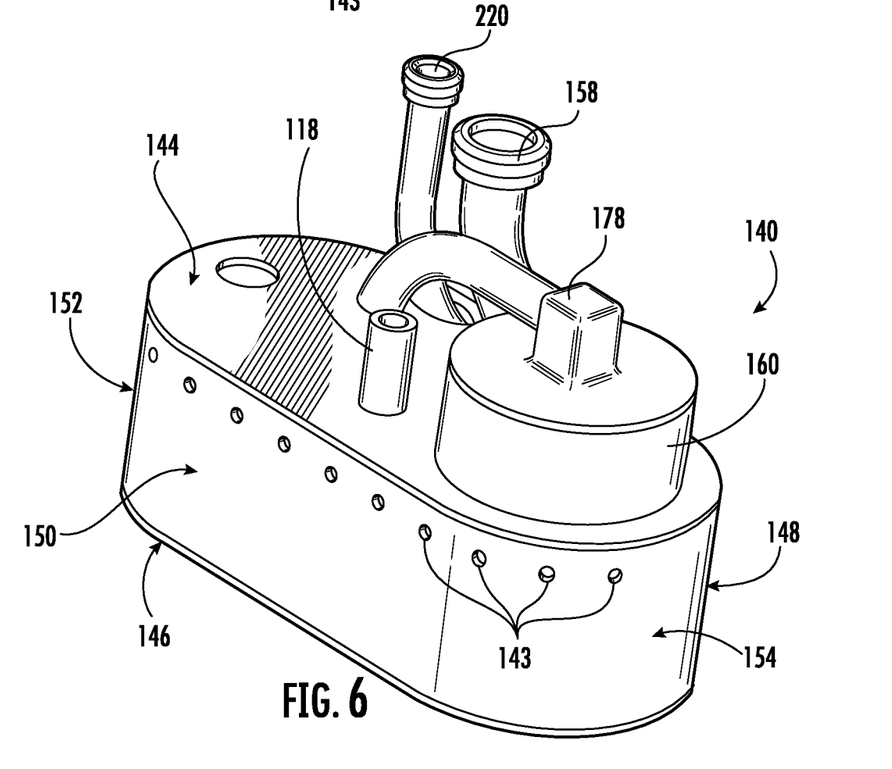
FIG. 6 is a rear perspective view of the separator of FIG. 5, according to an exemplary embodiment.
Figure 7:
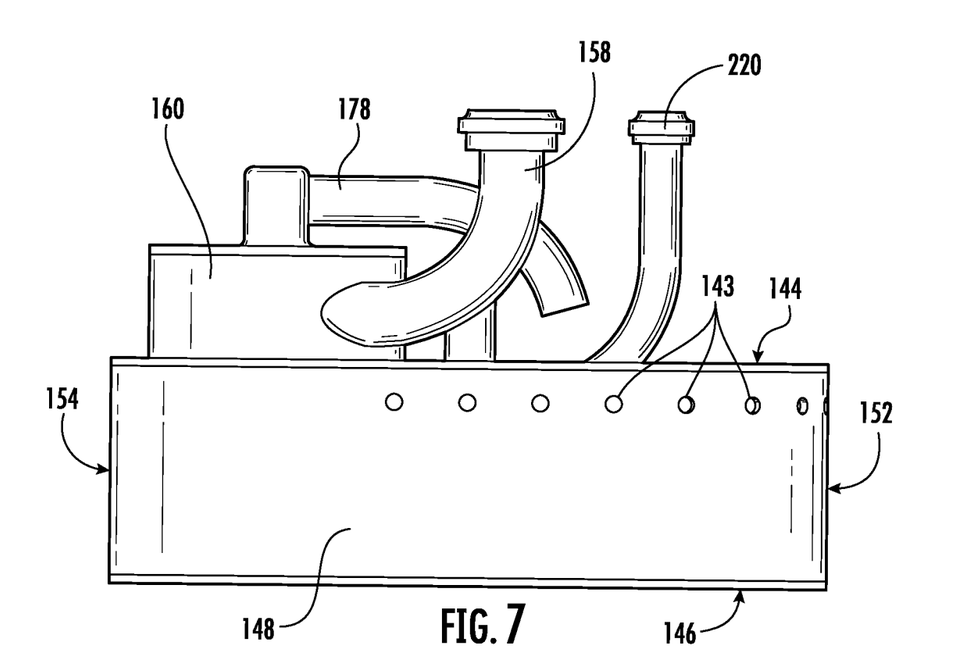
FIG. 7 is a front plan view of the separator of FIG. 5, according to an exemplary embodiment.
Figure 8:
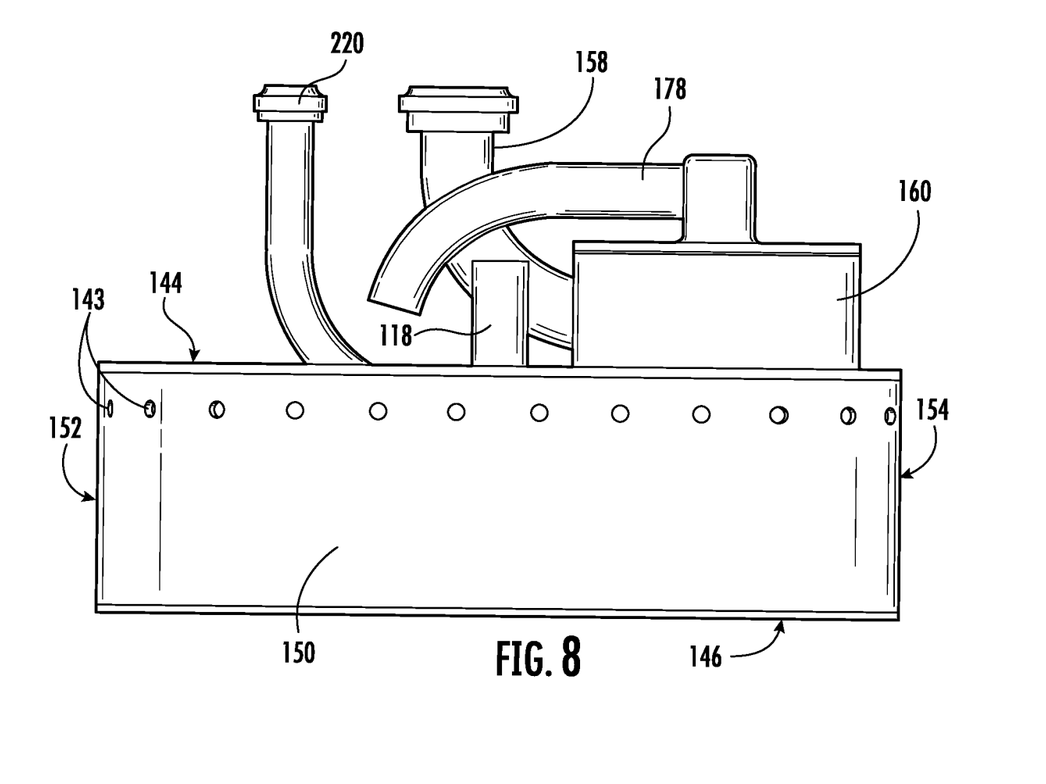
FIG. 8 is a rear plan view of the separator of FIG. 5, according to an exemplary embodiment.
Figure 9:
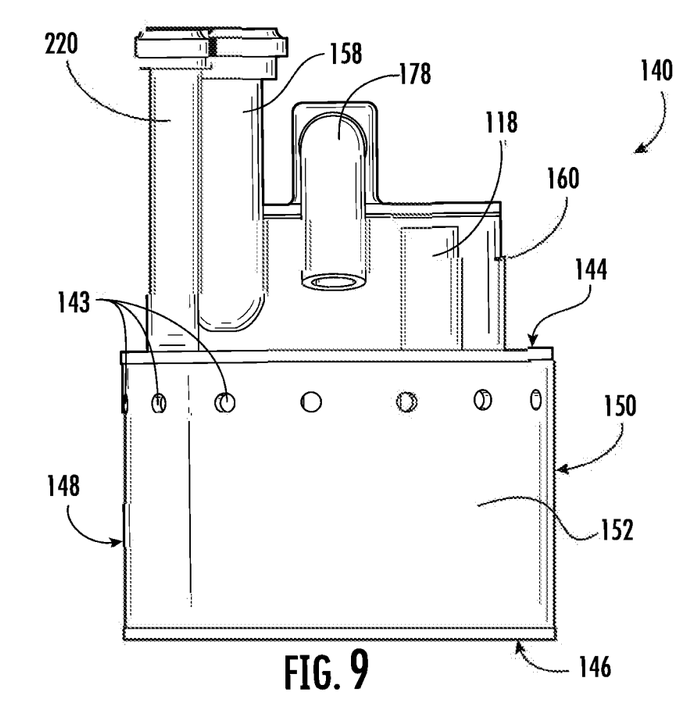
FIG. 9 is a right plan view of the separator of FIG. 5, according to an exemplary embodiment.
Figure 10:
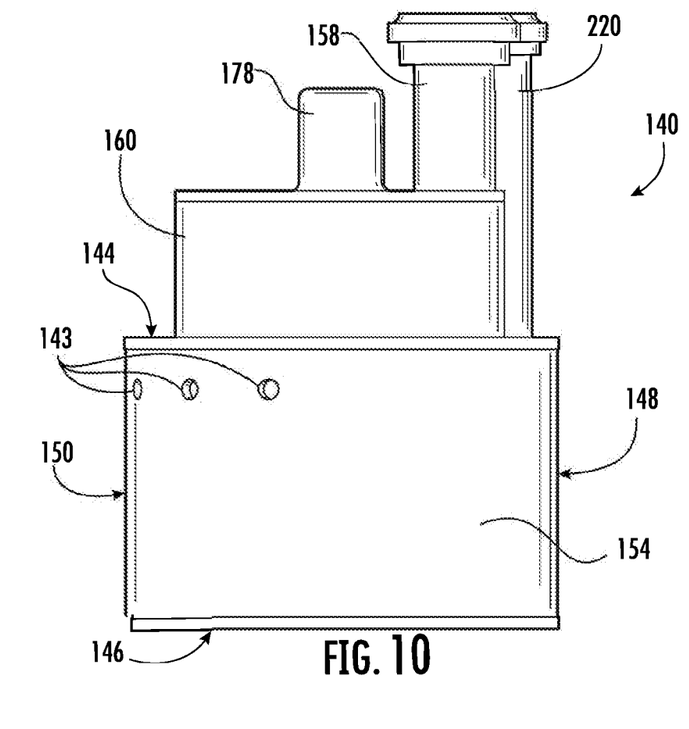
FIG. 10 is a left plan view of the separator of FIG. 5, according to an exemplary embodiment.
Figure 11:
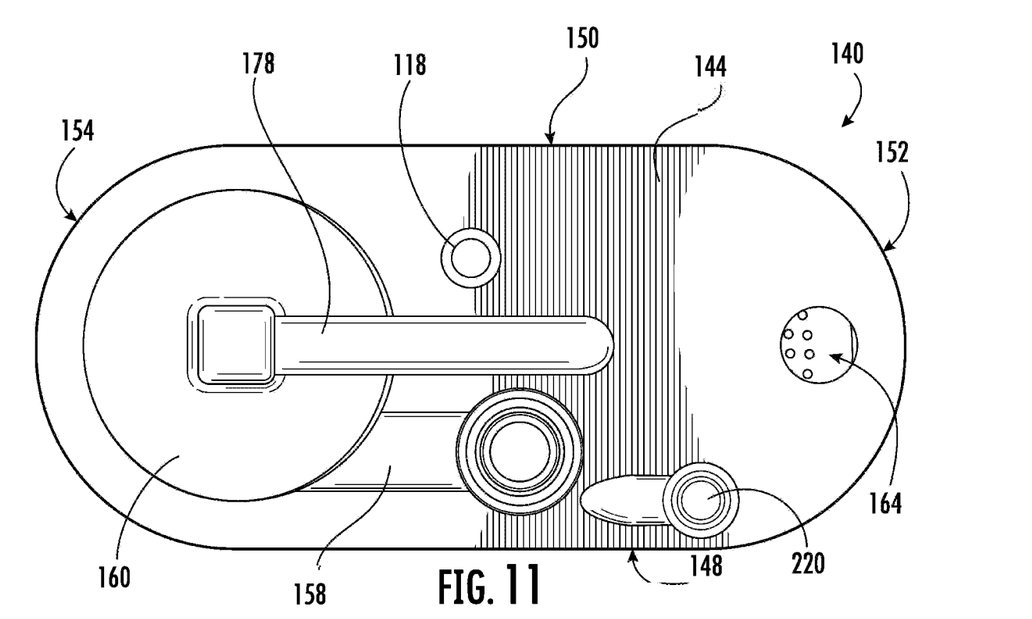
FIG. 11 is a top plan view of the separator of FIG. 5, according to an exemplary embodiment.

Referring to FIGS. 3 and 4, an air and oil separator 140 is shown mounted in storage compartment 116 of tank 100. Separator 140 is mounted to top surface 104 of tank 100 with mounting brackets 141. Specifically, separator 140 is located in an upper portion of storage compartment 116. Separator 140 is spaced from bottom surface 106 such that separator 140 does not touch bottom surface 106. Oil that travels through separator 140 is held below separator 140 in a lower portion of storage compartment 116.

Referring generally to FIGS. 5-12, separator 140 is shown and described according to an exemplary embodiment. Separator 140 has a body 142. Body 142 includes a top surface 144, a bottom surface 146 opposite top surface 144, a first side wall 148 located between top surface 144 and bottom surface 146, a second side wall 150 opposite the first side wall 148, a first curved outer wall 152 located between the top surface 144 and bottom surface 146 and between first side wall 148 and second side wall 150, and a second curved outer 154 wall located opposite the first curved outer wall 152. First side wall 148, second side wall 150, first curved outer wall 152, and second curved outer wall 154 are coupled together to form an outer wall of body 142. In certain embodiments, first side wall 148, second side wall 150, first curved outer wall 152, and second curved outer wall 154 are made of a single, continuous, contiguous piece of material. In other embodiments, two or more of the walls 148, 150, 152, and 154 may be a single, continuous, contiguous piece of material. Body 142 defines an internal chamber 156, and body 142 includes a plurality of air holes 143 that provide fluid communication for air between the internal chamber 156 and an exterior of body 142. Air holes 143 allow air within oil tank 100 to move between internal chamber 156 and storage compartment 116 of oil tank 100, and visa-versa. Air holes 143 help maintain a pressure between internal chamber 156 and oil tank 100. As shown, an air ventilation tube 118 passes through separator 140 to provide fluid communication for air from the lower portion of the tank 100 to the upper portion. This allows for air to exit the lower portion.

Referring generally to FIGS. 13-18, separator 140 and internal chamber 156 is shown. As shown, separator 140 includes an inlet 158, an entrance compartment or entrance chamber 160, a divider wall 162, and an outlet 164.

Figure 14:
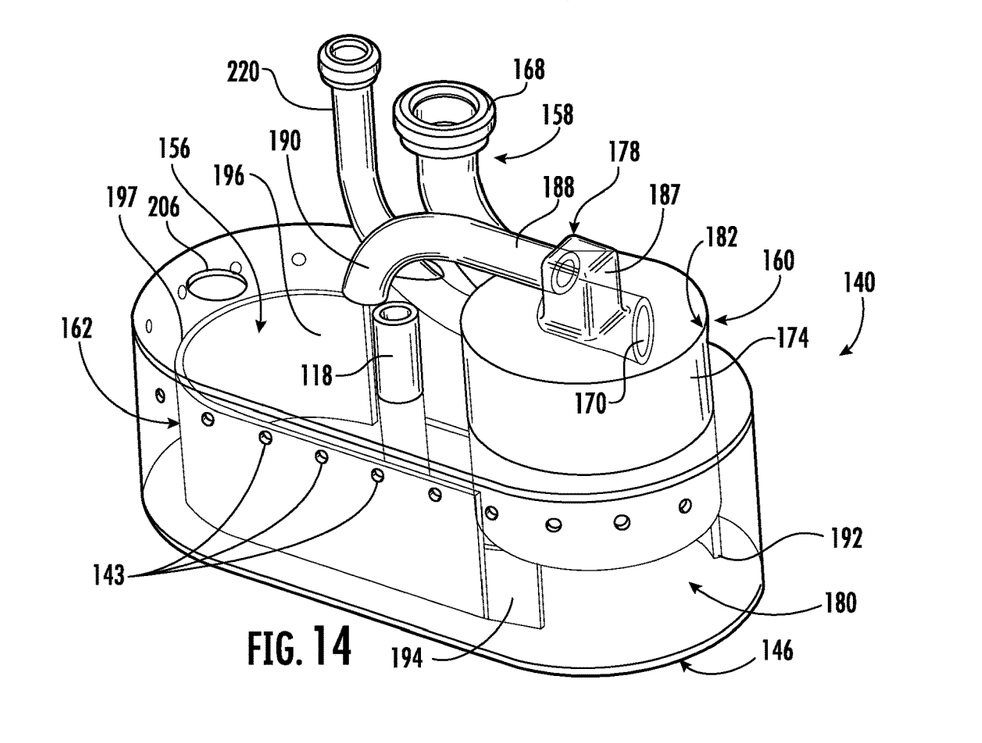
FIG. 14 is a rear perspective view of the separator of FIG. 5 with a transparent top surface and transparent side walls, according to an exemplary embodiment.
Figure 15:
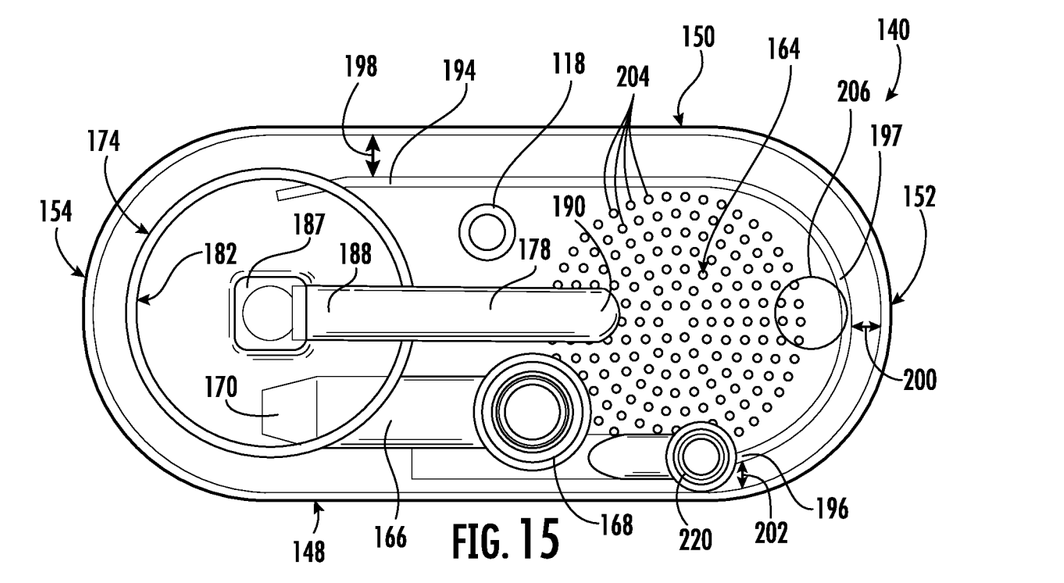
FIG. 15 is a top plan view of the separator of FIG. 5 with a transparent top surface, according to an exemplary embodiment.
Figure 16:
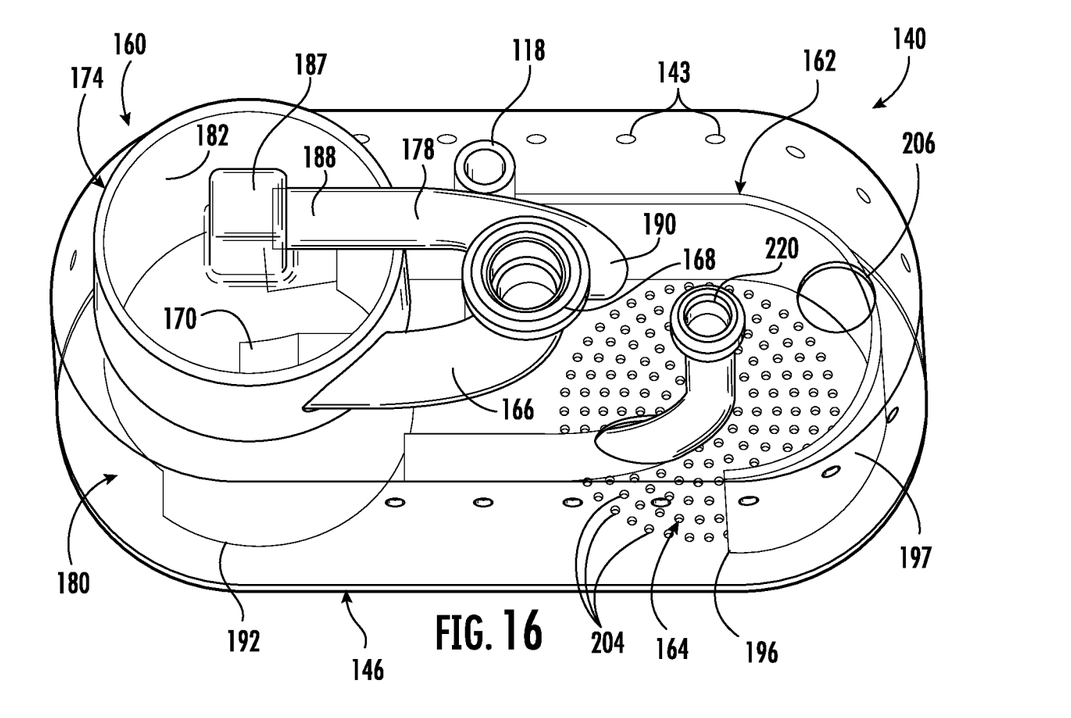
FIG. 16 is a top perspective view of the separator of FIG. 5 with a transparent top surface and transparent side walls, according to an exemplary embodiment.

Oil enters separator 140 through inlet 158. Inlet 158 provides fluid communication for oil between an exterior of the separator body and internal chamber 156. More specifically, inlet 158 provides fluid communication for oil between an exterior of oil tank 100 and entrance compartment 160. Inlet 158 includes a tube 166. Tube 166 extends between a first end 168 and a second end 170. First end 168 includes end cap 172. End cap 172 is coupled to top surface 104 of oil tank 100. As such, tube 166 allows oil to flow from outside of oil tank 100 through first end 168 and to second end 170. Second end 170 directs oil into entrance compartment 160. Specifically, second end 170 extends into entrance compartment 160. As best shown in FIGS. 14 and 15, second end 170 is tapered or pinched. Specifically, second end 170 has a cross-sectional area smaller than a cross-sectional area of the first end. This tapered shape increases the speed at which oil enters entrance compartment 160.

Entrance compartment 160 has an outer wall 174, a top 176, an air vent 178, and an opening 180. As oil exits second end 170, the oil is sprayed tangentially against outer wall 174. This spraying creates a swirling effect as the oil travels along an inside surface 182 of outer wall 174. This allows for some air to separate from the oil. Air that has separated from the oil travels up towards top 176 of entrance compartment 160 and through air vent 178. Meanwhile, the force of gravity pulls oil down towards bottom surface 146 and through opening 180.

As shown, entrance compartment 160 is located at least partially within internal chamber 156. Specifically, entrance compartment 160 is located between first side wall 148 and second side wall 150 and is closer to second curved outer wall 154. Outer wall 174 of entrance compartment 160 is convex with respect to second curved outer wall 154. As shown, outer wall 174 of entrance compartment 160 defines a cylinder shape and inside surface 182 is curved. Outer wall 174 has a full circumference.

Air that has separated from oil within entrance compartment 160 rises towards top 176. Air vent 178 is coupled to top 176 and provides fluid communication for air between internal chamber 156 and the exterior of body 142 and, more specifically, between entrance compartment 160 and the inside of oil tank 100. Air vent 178 includes housing or cap 187 and a tube 188 which directs air away from entrance compartment 160. Tube 188 extends from cap 187 towards a curved end 190 which directs the air downwards towards top surface 144. Curved end 190 is angled downward to allow any incidental oil that enters air vent 178 to travel through tube 188 and exit through curved end 190.

Meanwhile, oil in entrance chamber 160 travels down towards bottom surface 146 and opening 180. Opening 180 is located in outer wall 174 and along bottom edge 192 of outer wall 174. Opening 180 allows for oil to exit entrance chamber 160 and enter internal chamber 156. Opening 180 is positioned at an angle relative to second curved outer wall 154 to direct oil towards divider wall 162. As shown, opening is angled towards second side wall 150.

In specific embodiments, opening 180 extends a percentage around the circumference of outer wall 174. In certain embodiments, opening extends between 25% and 50% around the circumference and, more specifically, between 40% and 49%. In other embodiments, opening 180 extends a specific number of degrees around the circumference. In certain embodiments, opening 180 is less than 180 degrees of the circumference. More specifically, opening 180 is between 120 degrees and 175 degrees.

Swirling oil from entrance compartment 160 flows through opening 180 and is directed by divider wall 162 towards outlet 164. Divider wall 162 is spaced from body 142, which defines a flow channel through which oil flows from opening 180 to outlet 164. Oil flows at a relatively slower rate around divider wall 162 in comparison to the flow rate within entrance compartment 160. The slower movement around divider wall 162 allows for additional time for air to separate from the oil. Oil with less or no entrained air moves closer to and may attach to divider wall 162, while oil with more entrained air, relative to the other oil, moves closer to body 142 and may be carried by centrifugal force along outer walls 148, 150, 152, and 154.

Divider wall 162 is shaped similar to a portion of body 142. Divider wall 162 is perpendicular to bottom surface 146, and a portion of divider wall 162 is parallel to first side wall 148 and second side wall 150. Divider wall 162 may be made of multiple panels coupled together or a single, continuous, and contiguous piece of material.

Divider wall 162 extends between a first end 194 and a second end 196. First end 194 is adjacent to opening 180. As best shown in FIG. 14, first end 194 extends through opening 180 and extends under outer wall 174. Opening 180 is angled towards first end 194. An edge of opening 180 abuts a portion of first end 194. This allows for oil to be more easily directed by divider wall 162 through the flow channel. In certain embodiments, first end 194 may be coupled to outer wall 174.

Second end 196 of divider wall 162 is located opposite first end 194 and near outlet 164. Specifically, second end 196 is located between first side wall 148 and at least a portion of outlet 164. Second end 196 ends near where first curved outer wall 152 is connected to first side wall 148. That is, second end 196 ends where a curved portion of the body 142 transitions into a straight portion.

A curved section 197 of divider wall 162 is located between first end 194 and second end 196. Curved section 197 is located between first curved outer wall 152 and at least a portion of outlet 164. Curved section 197 is convex with respect to first curved outer wall 152. Curved section 197 may be positioned substantially equidistant from first curved outer wall 152. In some embodiments, curved section 197, first curved outer wall 152, and outlet 164 are concentric and share a same center. In other embodiments, curved section 197, first curved outer wall 152, and outlet 164 are eccentric and are off center with respect to each other. In other embodiments, at least two of curved section 197, first curved outer wall 152, and outlet 164 are concentric with respect to each other.

First side wall 148, second side wall 150, first curved outer wall 152, and second curved outer wall 154 define a perimeter of separator body 142. Divider wall 162 extends a length shorter than the length of the perimeter of the separator body 142. In certain embodiments, divider wall 162 extends a length that is at least 40% of the length of the perimeter of separator body 142. In another embodiment, divider wall 162 extends a length that is less than 80% of the length of the perimeter of separator body 142. More specifically, divider wall 162 extends a length that is between 50% and 70% of the length of the perimeter.

As shown in FIG. 15, divider wall 162 is spaced from body 142. First end 194 is spaced from second side wall 150 by a first distance 198. Curved section 197 is spaced from the first curved outer wall 152 by a second distance 200. And, second end 196 is spaced from first side wall 148 by a third distance 202. As shown, first distance 198 is greater than second distance 200, and second distance 200 is greater than third distance 202.

In a specific embodiment, second distance 200 is less than 1 inch, and more specifically is less than 0.500 inches. In a certain embodiment, second distance 200 is 0.375 inches.

Figure 23:
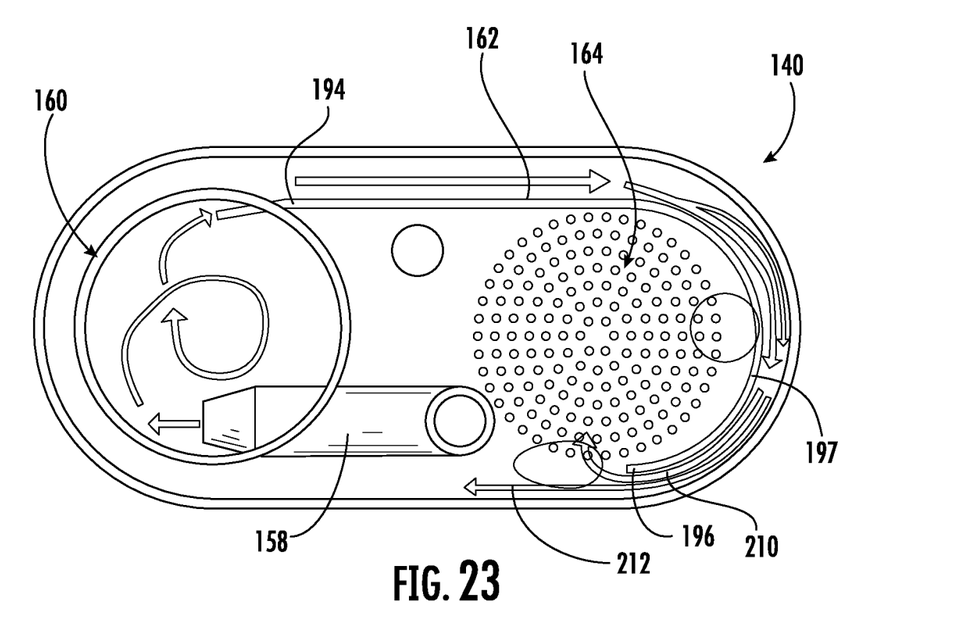
FIG. 23 is a top plan view of the separator of FIG. 5 with a transparent top surface and directional arrows to show illustrate the flow of oil through the separator, according to an exemplary embodiment.

As oil passes the second end 196 of divider wall 162, it continues to travel along the flow channel. Flow channel extends a distance past the end of the divider wall 162. Specifically, flow channel has an inner portion 210 and an outer portion 212, as shown in FIG. 23. Inner portion 210 is located relatively closer to divider wall 162, while outer portion 212 is located relatively closer to first curved outer wall 152 and second side wall 150. Oil with less or no entrained air travels along inner portion 210 (e.g., such as by attaching to divider wall 162), while oil with some and/or more entrained air, relative to other oil, travels along outer portion 212 (e.g., such as via the oil infused with air being biased towards the outer portion, such as via centrifugal force). The inner and outer flow channels travel in relatively the same direction until the oil passed the second end 196 of divider wall 162. At that point, the oil with more entrained air traveling along the outer portion 212 of the flow channel continues to travel along the outer walls in a substantially straight direction for a distance. In contrast, the inner portion 210 of the flow channel directs the oil with less or no entrained air to continue to curve and to intersect at least an outer portion of the outlet 164. As such, oil in the inner portion 210 of the flow channel can flow more directly towards the outlet 164. The oil then exits internal chamber 156 through outlet 164.

Figure 12:
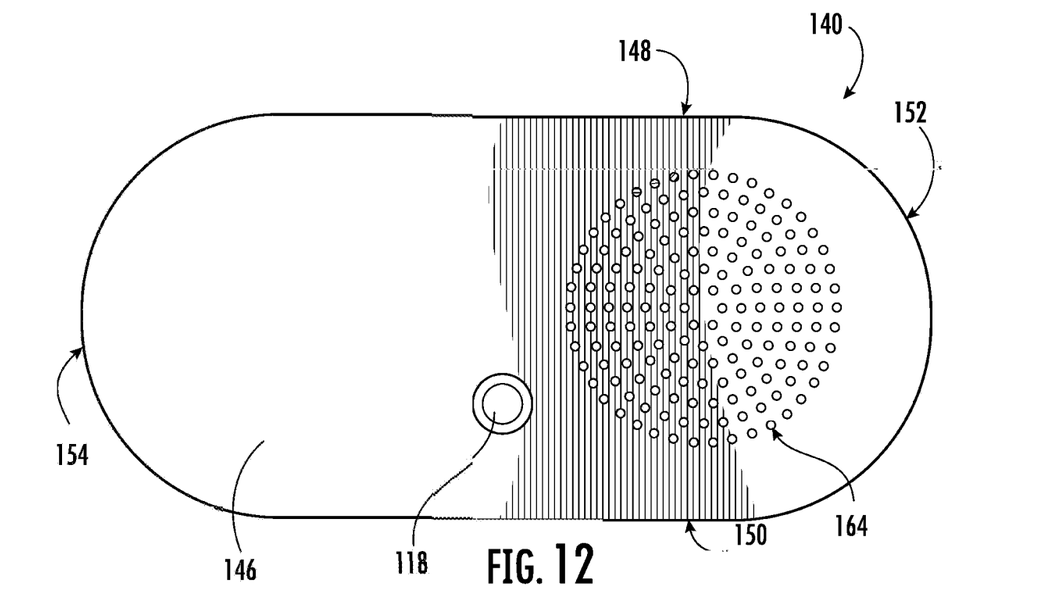
FIG. 12 is a bottom plan of the separator of FIG. 5, according to an exemplary embodiment.
Figure 13:
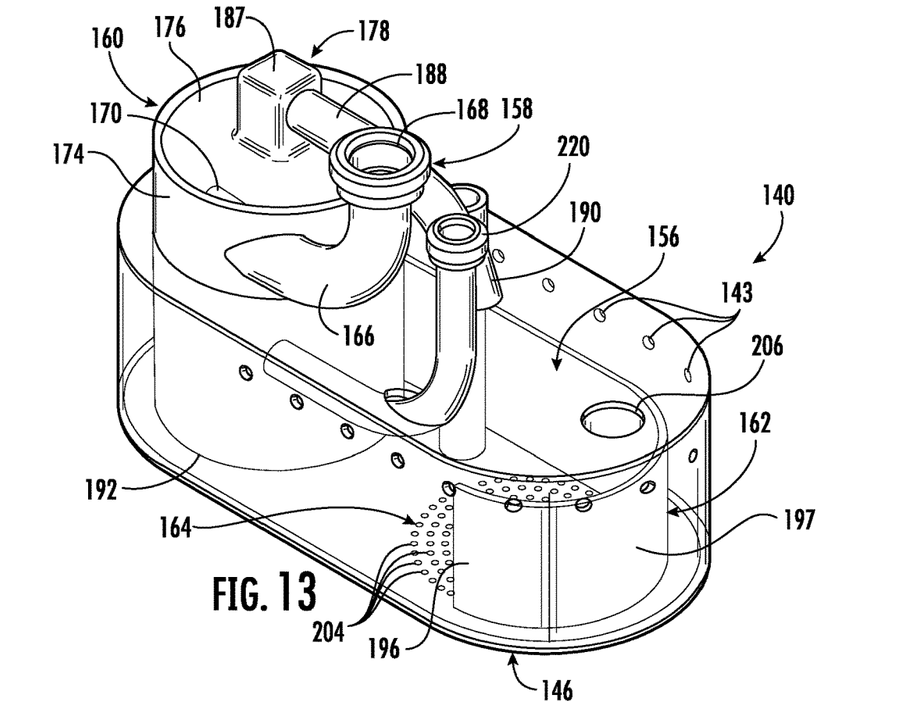
FIG. 13 is a front perspective view of the separator of FIG. 5 with a transparent top surface and transparent side walls, according to an exemplary embodiment.
Figure 17:
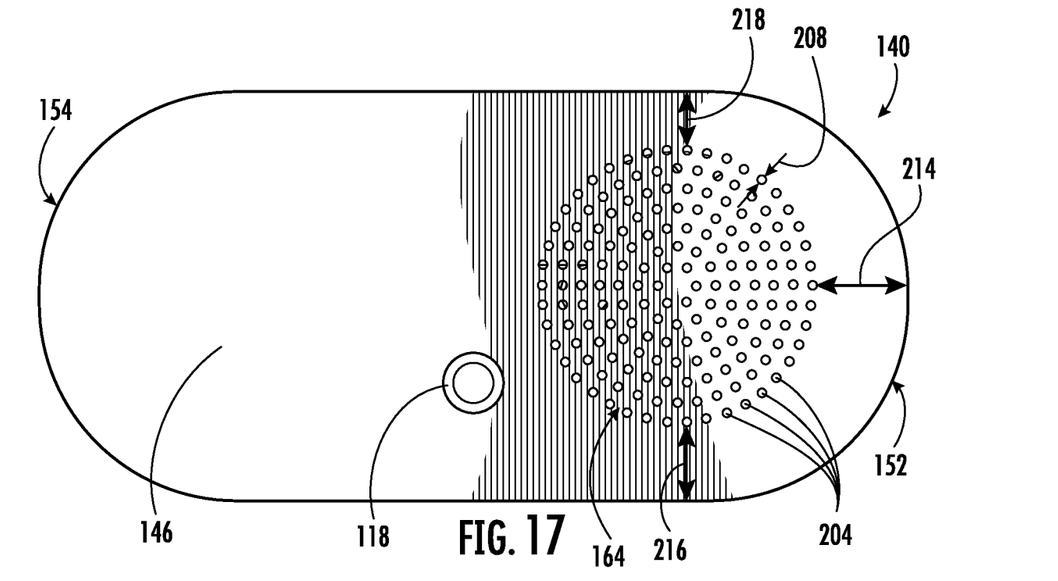
FIG. 17 is a bottom plan view of the separator of FIG. 5, according to an exemplary embodiment.
Figure 18:
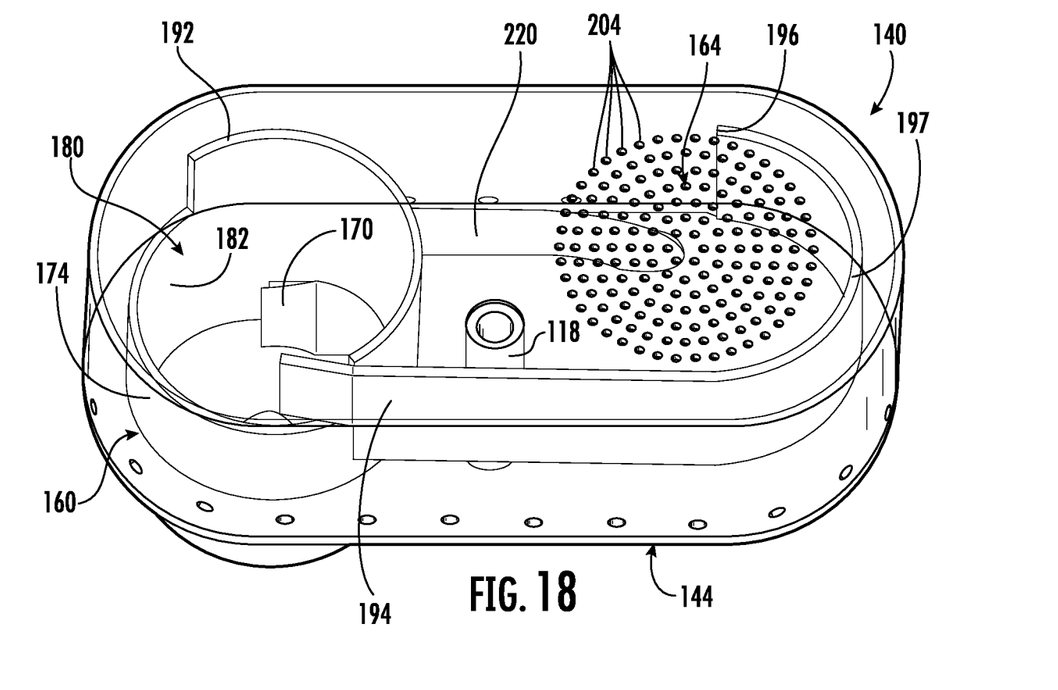
FIG. 18 is a bottom perspective view of the separator of FIG. 5 with a transparent bottom surface and transparent side walls, according to an exemplary embodiment.
Figure 19:
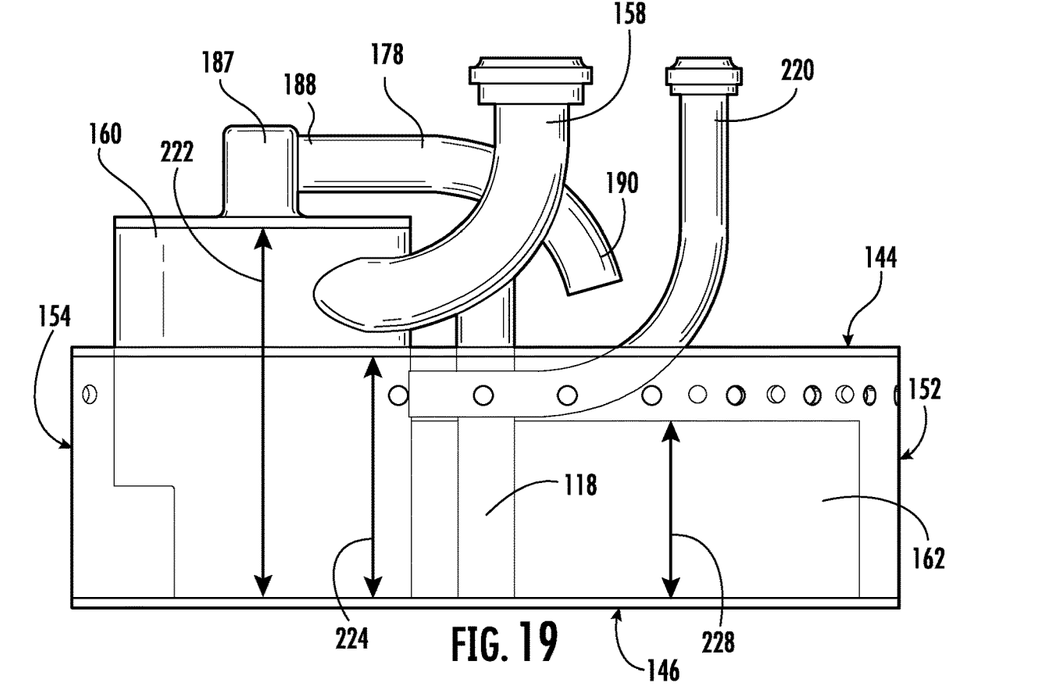
FIG. 19 is a front plan view of the separator of FIG. 5 with transparent side walls, according to an exemplary embodiment.
Figure 20:
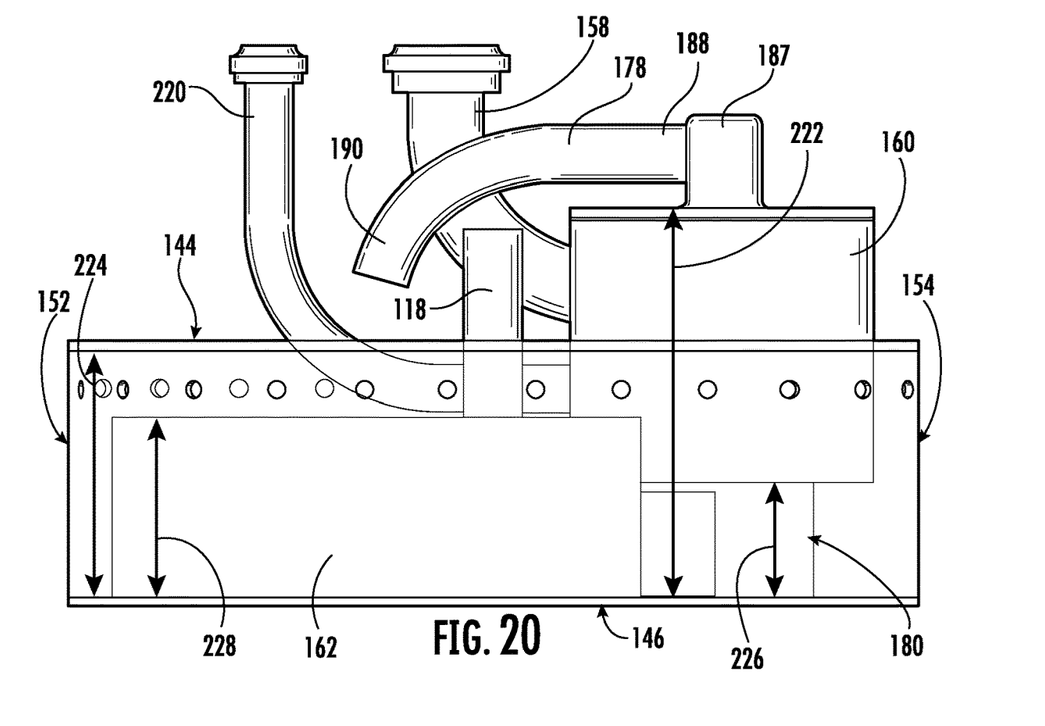
FIG. 20 is a rear plan view of the separator of FIG. 5 with transparent side walls, according to an exemplary embodiment.
Figure 21:
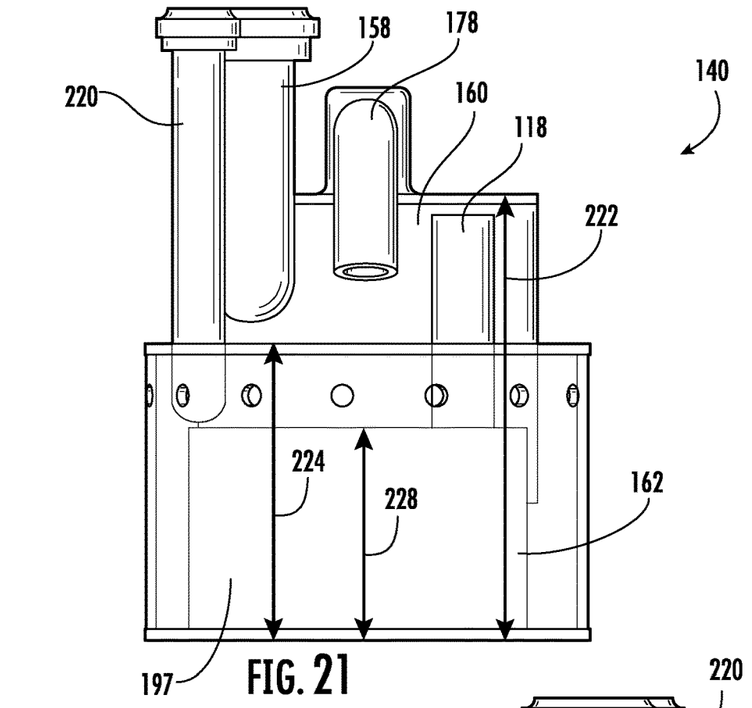
FIG. 21 is a right plan view of the separator of FIG. 5 with transparent side walls, according to an exemplary embodiment.
Figure 22:
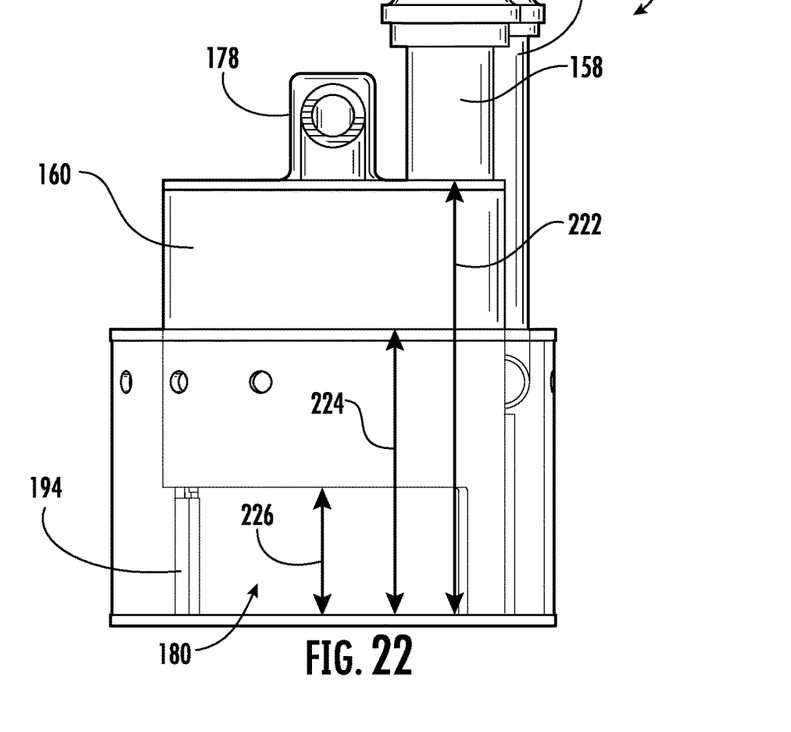
FIG. 22 is a left plan view of the separator of FIG. 5 with transparent side walls, according to an exemplary embodiment.

As best shown in FIGS. 12 and 17, outlet 164 is located in bottom surface 146 and includes a plurality of holes or apertures 204. Apertures 204 provide fluid communication for oil between internal chamber 156 and the lower portion of storage compartment 116 of oil tank 100. Some air bubbles may catch on the circumference of apertures 204, which prevents the air from flowing with the oil into oil tank 100. As more air bubbles are caught, the bubbles may connect with each other and rise out of the oil. Hole or vent 206 is located directly above outlet 164 to allow air caught by the holes to more easily escape internal chamber 156.

In a specific embodiment, apertures 204 each have a diameter 208 between 0.100 inches and 0.200 inches. More specifically, apertures have a diameter 208 of at least 0.125 inches. As shown, apertures 204 are arranged in a circular array. The circular array has a circumference. In some embodiments, the circumference of the circular array is the same as the circumference of outer wall 174. In certain embodiments, circular array has a circumference of between 3.0 inches and 3.5 inches.

Circular array has a surface area which includes apertures 204 and part of bottom surface 146. In certain embodiments, circular array has an aperture to bottom surface ratio of at least 1:4. In other embodiments, apertures 204 are at least 25% of the surface area of the circular array.

As shown in FIG. 17, plurality of apertures 204 are spaced from body 142. Apertures 204 are spaced from first curved outer wall 152 by at least a first distance 214. Apertures 204 are spaced from first side wall 148 by at least a second distance 216. And, apertures 204 are spaced from second side wall 150 by at least a third distance 218. As shown, third distance 218 is greater than first distance 214, and first distance 214 is greater than second distance 216.

In a specific embodiment, third distance 218 is at least 0.75 inches, and more specifically is 0.80 inches to 0.90 inches. In a certain embodiment, third distance is 0.82 inches.

As shown, separator 140 also includes a crank case return line 220. Crank case return line 220 provides fluid communication for oil and air between storage compartment 116 and internal chamber 156. Crank case return line 220 is located near second end 196 of divider wall 162.

Referring to FIGS. 19-22, side views of separator 140 are shown. As shown, entrance compartment 160 extends through top surface 144 of body 142. Entrance compartment 160 has a height 222 which is greater than a height 224 of body 142. First side wall 148, second side wall 150, first curved outer wall 152, and second curved outer wall 154 all have a height 224. Opening 180 has a height 226. Opening 180 is shorter than height 224 of body 142. Further, opening 180 is shorter than a height 228 of divider wall 162.

As shown, divider wall 162 is spaced from top surface 144 of separator 140. Divider wall 162 has a height 228, which extend upwards substantially perpendicular from bottom surface 146. In specific embodiments, height 228 of divider wall is at least 50% of height 224 of body 142. More specifically, divider wall is at least 75% of height 224.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature. As used herein, "rigidly coupled" refers to two components being coupled in a manner such that the components move together in a fixed positional relationship when acted upon by a force.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An oil tank, comprising:
   a tank body defining a storage compartment having an upper portion and a lower portion;
   a separator body in the upper portion of the tank body, the separator body including a top surface, a bottom surface opposite the top surface, an outer wall located between the top surface and bottom surface, and an internal chamber defined by the top surface, the bottom surface, and the outer wall;
   an inlet providing fluid communication for oil between an exterior of the separator body and the internal chamber;
   an air vent providing fluid communication for air between the internal chamber and the exterior of the separator body; and
   a divider wall spaced by a distance from a curved portion of the outer wall, the divider wall being convex with respect to the curved portion of the outer wall, the divider wall and the curved portion of the outer wall defining a flow channel through which the oil flows; and
   an outlet providing fluid communication between the internal chamber and the lower portion of the tank body, the divider wall located between the curved portion of the outer wall and at least a first portion of the outlet.

2. The oil tank of claim 1, wherein the distance the divider wall is spaced from the curved portion of the outer wall is less than 1 inch.

3. The oil tank of claim 1, wherein the divider wall is substantially equidistant from the curved portion of the outer wall.

4. The oil tank of claim 1, wherein a height of the divider wall is at least 50% of a height of the outer wall.

5. The oil tank of claim 1, wherein the outer wall defines a perimeter of the separator body, wherein the divider wall extends a length at least 40% of a length of the perimeter.

6. The oil tank of claim 1, wherein the inlet includes a tube, the tube having a first portion and a second portion, the first portion defining a first cross-sectional area smaller than a second cross-sectional area of the second portion, and wherein the first portion is located between the internal chamber of the separator body and the second portion.

7. The oil tank of claim 1, wherein the outer wall of the separator body includes a plurality of holes providing fluid communication for air between the internal chamber and the exterior of the separator body.

8. An air and oil separator, comprising:
   a body including a top surface, a bottom surface opposite the top surface, an outer wall located between the top surface and bottom surface, and an internal chamber defined by the top surface, the bottom surface, and the outer wall;
   an inlet providing fluid communication for oil between the internal chamber and an exterior of the body;
   a plurality of apertures providing fluid communication for oil between the internal chamber and the exterior of the body, the plurality of apertures spaced at least 0.75 inches from the outer wall; and
   a divider wall located between the outer wall and at least a first portion of the plurality of apertures.

9. The air and oil separator of claim 8, wherein each aperture of the plurality of apertures has a diameter of between 0.100 inches and 0.200 inches.

10. The air and oil separator of claim 9, wherein each aperture of the plurality of apertures has a diameter of at least 0.125 inches.

11. The air and oil separator of claim 8, wherein the plurality of apertures define a circular array.

12. The air and oil separator of claim 11, wherein the circular array has an aperture to surface ratio of at least 1:4.

13. The air and oil separator of claim 11, wherein the plurality of apertures define at least 25% of a surface area of the circular array.

14. An air and oil separator, comprising:
   a body including a top surface, a bottom surface opposite the top surface, a first side wall located between the top surface and bottom surface, a second side wall opposite the first side wall, and an internal chamber defined by the top surface, the bottom surface, first side wall, and second side wall;

an entrance compartment located in the internal chamber between the first side wall and the second side wall, the entrance compartment including an outer wall and an opening in the outer wall;

an inlet providing fluid communication for oil between an exterior of the body and the entrance compartment;

an air vent located in the entrance compartment and providing fluid communication for air between the entrance compartment and the exterior of the body;

an outlet providing fluid communication for oil between the internal chamber and the exterior of the body; and a divider wall having a first end and a second end, the first end attached to the outer wall of the entrance compartment adjacent to the opening, and the second end located between the second side wall and at least a first portion of the outlet, wherein the divider wall defines a flow channel through which oil flows from the opening to the outlet.

15. The air and oil separator of claim 14, wherein the first end of the divider wall is spaced from the first side wall of the body by a first distance and the second end of the divider wall is spaced from the second side wall of the body by a second distance, wherein the first distance is greater than the second distance.

16. The air and oil separator of claim 14, wherein the second side wall includes a curved portion and a straight portion, wherein the second end of the divider wall ends near where the curved portion transitions to the straight portion.

17. The air and oil separator of claim 14, wherein the outer wall of the entrance compartment defines a circumference, and wherein the opening is less than 180 degrees of the circumference.

18. The air and oil separator of claim 14, wherein the flow channel extends a distance past the second end of the divider wall.

19. The air and oil separator of claim 18, wherein an inner portion of the flow channel intersects an outer portion of the outlet.

20. The air and oil separator of claim 14, wherein the flow channel includes an inner portion and an outer portion, and wherein the inner portion of the flow channel flows slower than the outer portion, whereby oil infused with air is biased towards the outer portion.

\* \* \* \* \*